United States Patent [19]

Sato

[11] Patent Number: 5,213,778
[45] Date of Patent: May 25, 1993

[54] METHOD FOR TREATING COMBUSTION EXHAUST GASES

[75] Inventor: Inomatsu Sato, Tokyo, Japan

[73] Assignee: Yuichi Sato, Harbor City, Calif.

[21] Appl. No.: 557,373

[22] Filed: Jul. 24, 1990

[51] Int. Cl.$^5$ ............... B01D 47/00; C01B 17/16; C01B 21/00; C01B 7/00
[52] U.S. Cl. .................... 423/210; 423/220; 423/235; 423/240 R
[58] Field of Search ............ 423/210, 239 R, 235, 423/220, 240 R

[56] References Cited

U.S. PATENT DOCUMENTS 3,616,597 11/1971 Stewart ........................ 423/210
3,668,833 6/1972 Cahill ........................... 423/210
3,923,956 12/1975 Bowman ....................... 423/210

Primary Examiner—Gregory A. Heller
Attorney, Agent, or Firm—Seldon & Scillieri

[57] ABSTRACT

A method for treating the combustion gases produced by the incineration of industrial waste and the like is disclosed wherein the gases are sprayed with $H_2O$ to form a saturated aqueous vapor that absorbs the noxious materials in the gases, and wherein the vapor is then sprayed with neutralizing agent as it passes through a succession of neutralizing chambers.

7 Claims, 4 Drawing Sheets

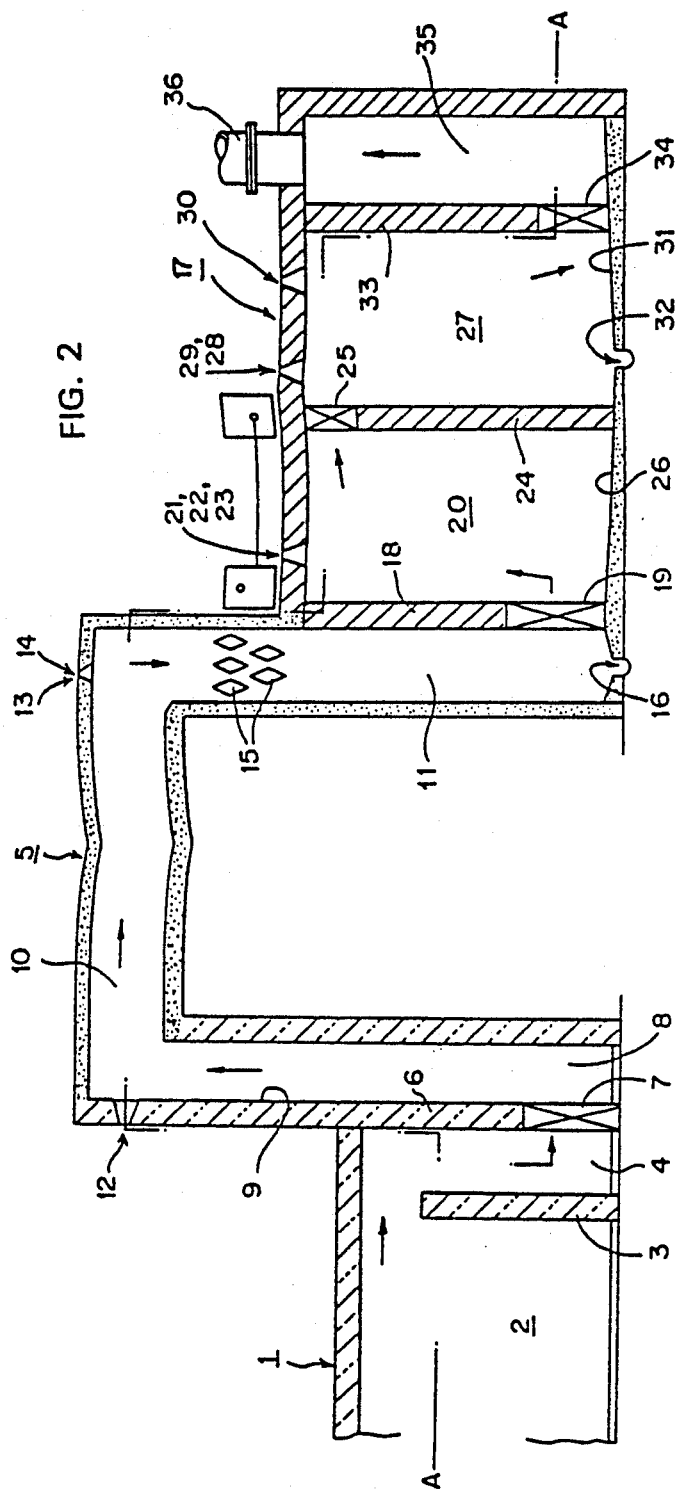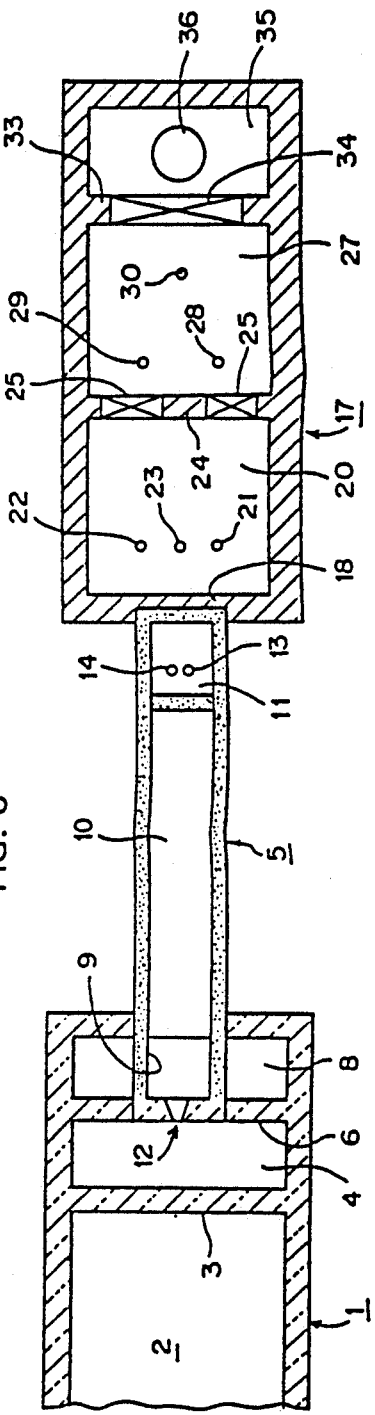

Efficiency

METHOD FOR TREATING COMBUSTION EXHAUST GASES

FIELD OF THE INVENTION

This invention relates to a method for treating combustion exhaust gases produced by the incineration of a variety of industrial wastes.

BACKGROUND OF THE INVENTION

Although incineration of industrial wastes is typically a convenient process of disposal, increasing concerns about environmental impact have made incineration substantially less desirable owing to noxious combustion exhaust gases produced by incineration. This is particularly true where polymer wastes are burned, forming combustion gases that include HCl, NO, and/or NOX. In addition, incineration creates gases containing $CO_2$, currently regarded as the prime cause of global warming.

BRIEF DESCRIPTION OF THE PRIOR ART

One method known in the art for reducing the release of such gases calls for the addition of a secondary combustion chamber to the primary combustion chamber of the incinerator. Unburnt gases from the primary combustion chamber are led into the secondary combustion chamber, and burnt again using an afterburner. This reduces the concentration of smoke and soot, but requires a large amount of fuel to carry out the afterburning process.

Another known method, schematically depicted in FIG. 1, provides a furnace having a primary combustion chamber 101 and a secondary combustion chamber 103. Waste is fed into the primary combustion chamber via an input port 107 and is supported on a roaster 108 during the primary combustion process. During combustion, a blower 106 forces a specified amount of air into the primary combustion chamber 101 via a supply pipe 104. The air exits the supply pipe via a number of jet exits 105 which are disposed about the pipe's circumference. The smoke from the primary chamber 101 enters the secondary chamber 103 via a connecting port 102. The unburnt gases in the smoke are then incinerated during a secondary combustion process, with an air blower 112 providing a specified amount of air via a second supply pipe 111 to support the secondary combustion. The resulting exhaust gas is then discharged from a smoke stack 114. The improved combustion efficiency resulting from this method restrains the formation of noxious gases. Ashes which accumulate during the combustion process can be removed via outlets 109, 113 as needed.

In practice, it is difficult to maintain the balance between the quantity of combustibles in the primary combustion chamber (e.g., the total quantity of carbons) and the amount of air supplied in the process depicted by FIG. 1. Noxious unburnt gases form whether too much air, or an insufficient amount of air, is supplied. When an insufficient amount of air is supplied, combustion is incomplete. When too much air is supplied, combustion has been found to accelerate to such a great extent that an insufficient amount of oxygen is present to permit complete combustion. Accordingly, complete combustion of material (and a corresponding minimal formation of noxious gases) requires the maintenance of a delicate correlation of oxygen, combustion and heat. Because, however, wastes typically comprise heterogeneous mixtures, it is not feasible to delicately balance these parameters. Furthermore, since the required temperature for complete combustion can be 1,000° C. or above, special heat-resistant steels, or similar materials, must be used for making the supply pipes 104, 111 to prevent degradation of the incinerator's operation in completely burning the entrapped gases.

SUMMARY OF THE INVENTION

The invention herein is directed to converting noxious exhaust gases resulting from the incineration of various industrial wastes into completely innocuous materials. Briefly, $H_2O$ is sprayed on the high temperature gases produced in the incinerator, lowering the temperature of the exhaust gases and, at the same time, changing the $H_2O$ into saturated aqueous vapor. Under these conditions, respective microparticles of the saturated aqueous vapor contact with, and collide against, each other in a turbulent motion as a result of the intermolecular attraction between them. During the repeated mutual contacts and collisions, the microparticles react with the exhaust gases and absorb the dusts contained in the exhaust gas. The resulting bubble particles, comprising saturated aqueous vapor and absorbed noxious materials, eventually collapse and turn into acidic waste liquid which can be collected. A basic neutralizer is then sprayed on the acidic waste liquid prior to collection, and on any remaining saturated aqueous vapor, as the material flows through a neutralization chamber. When the concentration of noxious materials in the exhaust gases is relatively high, the foregoing neutralization process can be repeated as necessary as the material flows through a succession of neutralization chambers until the exhaust gas has been converted into an innocuous material.

Other features of the invention will be easily seen from the following description of a preferred embodiment, of which the drawing is a part.

DESCRIPTION OF THE DRAWING

FIG. 2 is a schematic representation of a front elevation view, in section, of equipment for treating combustion exhaust gases in accordance with the invention;

FIG. 3 is a top sectional view of the equipment in FIG. 2, taken along line 3—3;

DESCRIPTION OF THE PREFERRED EMBODIMENT

Figure 1:
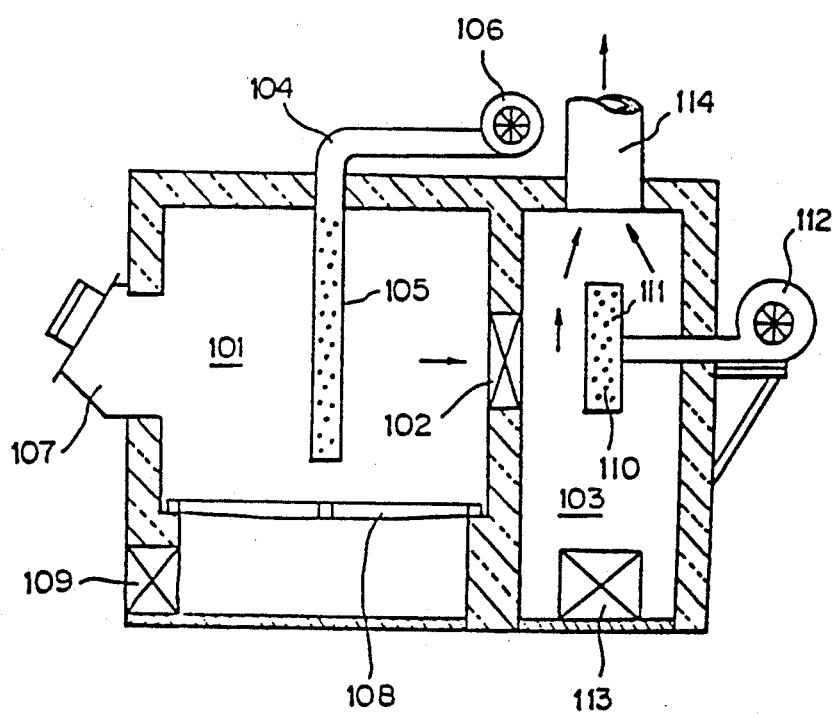
FIG. 1 is a front elevation view, in section, of equipment known in the art for treating combustion exhaust gases.

FIGS. 2 and 3 are respectively front and top sectional views, in schematic, depicting equipment for implementing the treatment method described herein. The equipment includes a combustion furnace 1, a reaction unit 5 and a neutralization unit 17. The combustion furnace 1 is comprises a furnace casing having sufficient thermal resistance and capacity to house and burn industrial wastes. A partition 3 cooperates with an wall 6 of the furnace 1 to define a smoke-conducting flue 4.

The reaction zone 5 comprises a horizontal reaction chamber 10 communicating with the smoke-conducting flue 4 via a generally vertically extending, inlet flue 8 at its upstream end. The inlet flue 8 communicates with the furnace flue 4 via a smoke-conducting port 7 formed in the common wall 6 between the inlet flue 8 and furnace 1. The downstream end of the horizontal reaction chamber 10 communicates with a generally vertically extending primary neutralization chamber 11. The upstream end of the primary neutralization chamber 11 includes a plurality of separators 15, described in greater detail below. Smoke from the combusting waste in the furnace 1 escapes from the combustion chamber 2 via flue 4, port 7 and flue 8, and travels through the horizontal reaction chamber 10 and primary neutralization chamber 11 towards an outlet flue 19.

As the exhaust gases from the combusting waste travel through the horizontal reaction chamber 10, it is sprayed with water. Accordingly, an injection port 12 is positioned in the upstream end of the horizontal reaction chamber 10 to spray the water into the exhaust gases. The microparticles of sprayed water reduce the temperature of the exhaust gas, and are at the same time changed into a saturated aqueous vapor by the exhaust gas temperature. As the saturated aqueous vapor contacts the noxious materials in the exhaust gas, it reacts with the noxious materials and becomes an acidic saturated aqueous vapor. During this process, contact between the vapor and noxious materials is enhanced by the stirring action that results from the intermolecular attraction between the microparticles of the vapor. During the repeated mutual collisions and contact which take place during this stirring action, the microparticles also absorb and collect the dusts contained in the exhaust gas.

The path of the exhaust gas through the reaction chamber 10 is sufficiently long to enable a large number of the microparticles of saturated aqueous vapor to break down and turn into an acidic liquid as they reach the upstream end of the primary neutralization chamber 11. As the saturated aqueous vapor and acidic liquid begin their decent in the primary neutralization chamber 11, they are sprayed with a neutralizing agent which enters the upstream end of the chamber via jet ports 13, 14. In practice, such neutralizing agents as ammonium carbonate, caustic soda (NaOH), and calcium hydroxide can be used. Ammonium carbonate is relatively expensive, however, and calcium hydroxide becomes suspended and precipitated (although high in neutralizing efficiency). Accordingly, it is believed that caustic soda, which is soluble in water, is generally the preferred agent as a practical matter.

The neutralizing agent substantially neutralizes the acidic microparticles and waste liquid. The waste liquid can then be collected and evacuated via a collection port 16 at the bottom of the neutralization chamber 11.

To maximize the conversion of the acidic microparticles to waste liquid, a number of condensing separators 15 are positioned in the path of the descending microparticles in primary neutralization chamber 11. The contacting of the particles with the separators convert most of the microparticles into waste liquid, with any remaining microparticles being conducted into a secondary neutralization chamber 20 of the neutralization unit 17 via port 19 at the downstream end of the primary neutralization chamber.

The secondary neutralization chamber is separated from the primary neutralization chamber by a common wall 18 in which the port 19 is formed. In the illustrated embodiment, a tertiary neutralization chamber 27 is similarly separated from the secondary chamber 20 by a common wall 24, and communicated via a port 25. A pair of jets 21, 22 and an auxiliary jet 23 are positioned at the top of the secondary neutralization chamber 20 to spray the vapor microparticles flowing through the chamber with neutralizing agent once again. Similarly, a pair of jets 28, 29 and an auxiliary jet 30 are positioned in the top of the tertiary chamber 27 to spray the neutralizing agent into the vapor traveling through that chamber.

It will be recognized that any number of neutralization chambers can be provided, although the illustrated embodiment utilizes three. In practice, three such chambers are typically sufficient to completely neutralize the combustion gases. Accordingly, the tertiary chamber 27 communicates with an exhaust flue 35 via a port 34 in a common wall 33. The flue 35 is vented to atmosphere via a smokestack 36.

As the microparticles are drawn upward in the secondary neutralization chamber 20, towards the port 25, a counter flow of neutralizing agent is sprayed from jets 21, 22, 23 into the rising mass. The resulting neutralized waste liquid drops to the floor 26, and any remaining microparticles reaching the port 25 flow through the tertiary chamber 27 where they are again sprayed with neutralizing agent from jets 28, 29, 30. The resulting waste liquid drops to the floor 31 of the tertiary chamber 27. The floor 26 of the secondary chamber 20, and the floor 31 of the tertiary chamber 27 is provided with an incline that conducts the waste liquid toward a second collection port 32, where it can be evacuated.

Any remaining vapor which enters the exhaust flue 35 has been essentially, if not completely, cleared of noxious materials, and can be discharged to the environment. The flue accordingly conducts the remaining vapor from the tertiary chamber 27 to a smoke stack 36 for discharge. The floor of the flue 35 also includes an inclined floor 31 that collects waste liquid forming in flue 35, and conducts it to the second collection port 32 via the port 34.

Figure 4:
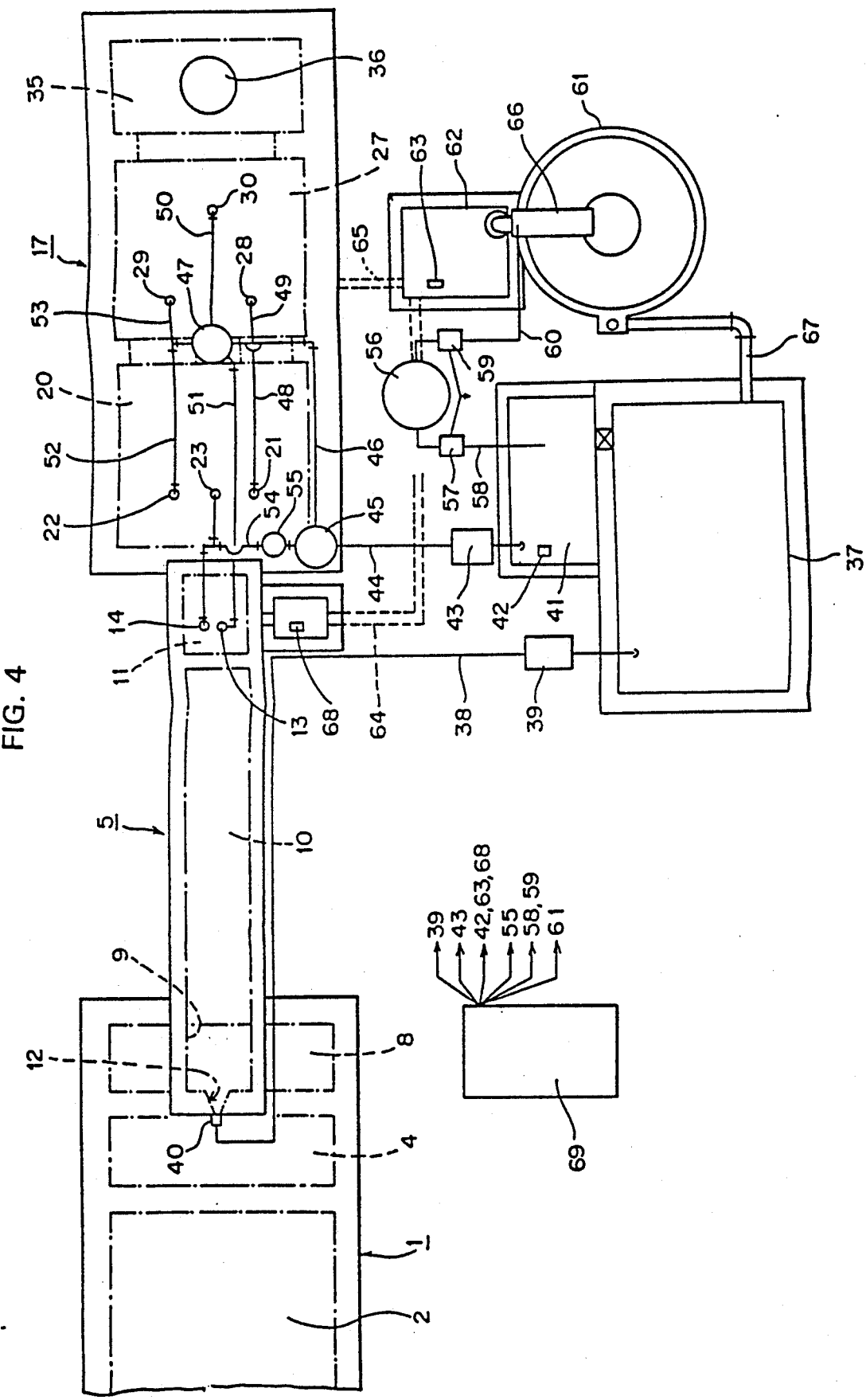
FIG. 4 is a top view of the equipment similar to FIG. 3, but schematically depicting the liquid handling components of the system.

FIG. 4 is a top view of the equipment similar to FIG. 3, but schematically depicts the liquid handling components of the system. The liquid-handling components of the system may conveniently be divided into those which carry water, those which carry neutralizer, and those which carry the waste liquid. The waste-carrying components are shown to include a pipe 64 which conducts waste liquid from the waste collection port 16 (FIG. 2) via a first pH sensor 63 to a waste liquid tank 62. A second pipe 65 conducts waste liquid from the waste liquid collection port 32 (FIG. 2) to the tank 62. A second pH sensor 63 within the tank 62 monitors the content of the tank.

The outlet of the tank 62 is connected to a separation tank 61 via a suction pipe 66. The separation tank 61 separators the sludge in the waste liquid from the liquid. As described below, appropriate quantities of neutralizer enter the separator tank's suction pipe 66 via a pipe 60, and are mixed with the waste liquid in the separating tank. Consequently, the removal of the sludge from the waste liquid results in the recovered liquid being neutral in pH and clear; i.e., water.

The water-conducting components of the illustrated system include a water storage tank 37 connected to the jet 40 (FIG. 2) in the horizontal reaction chamber 10 (FIG. 2) via a pump 39 and pipe 38. Recovered water from the separating tank 61 is returned to the storage tank 37 via a purged water pipe 67.

The neutralizing agent is stored in a neutralizer tank 41. It is conducted via a pump 43 and pipe 44 to a manifold 45, where it is distributed to the jets in the neutralization chambers. A pipe 46 from the header 45 conducts the neutralizer to jets 21, 28 (FIG. 2) in the secondary and tertiary neutralization chambers 20, 27 and to a second manifold 47 which, in turn, distributes the neutralizer to the jets 13, 22, 29, 30 in the primary, secondary and tertiary neutralization chambers. The auxiliary jets 14, 23 are separately connected to manifold 45 through a valve 55 and pipe 54.

As previously described, the neutralizer tank 41 also supplies neutralizing agent to the separator tank 61. Neutralizing agent is accordingly conducted via a pipe 58, a measuring pump 57, a secondary neutralizer tank 56, a second measuring pump 59, into the pipe 60 which connects to the suction pipe 66 of the separator tank 61.

A microprocessor 69 is responsive to signals from the pH sensors 42, 63, 68 to control the pumps 39, 43, 57, 59 and the valve 55 so that appropriate quantities of neutralizer are used in the aforedescribed process. When the pH sensors indicate to the microprocessor 69 that the concentration of noxious material in the exhaust gas from the combustion chamber 2 exceeds a preset acidity value stored in the microprocessor, the microprocessor opens the valve 55 to permit additional quantities of neutralizer to be sprayed via the auxiliary jets 14, 23. If excessive neutralizer is sprayed, or the concentration of the noxious materials otherwise decreases below the preset value, the signal from the pH sensors to the microprocessor will cause the valve 55 to be shut and the auxiliary jets to be deactivated.

EXAMPLE 1

Industrial wastes, including 30% polymer system wastes, were incinerated as follows:
Calorific Value: 4,000 Kcal/kg
Burnt-up quantity: approx. 300 kg/h
Exhaust gas temp. 450°–500° C. at entrance to reaction chamber
$H_2O$ temp. 15° C.
Quantity of $H_2O$ sprayed: 25 liters/minute continuous
Neutralizer: NaOH; pH 12 saturated solution; 0.8 liters/minute continuous spray.

Figure 5:
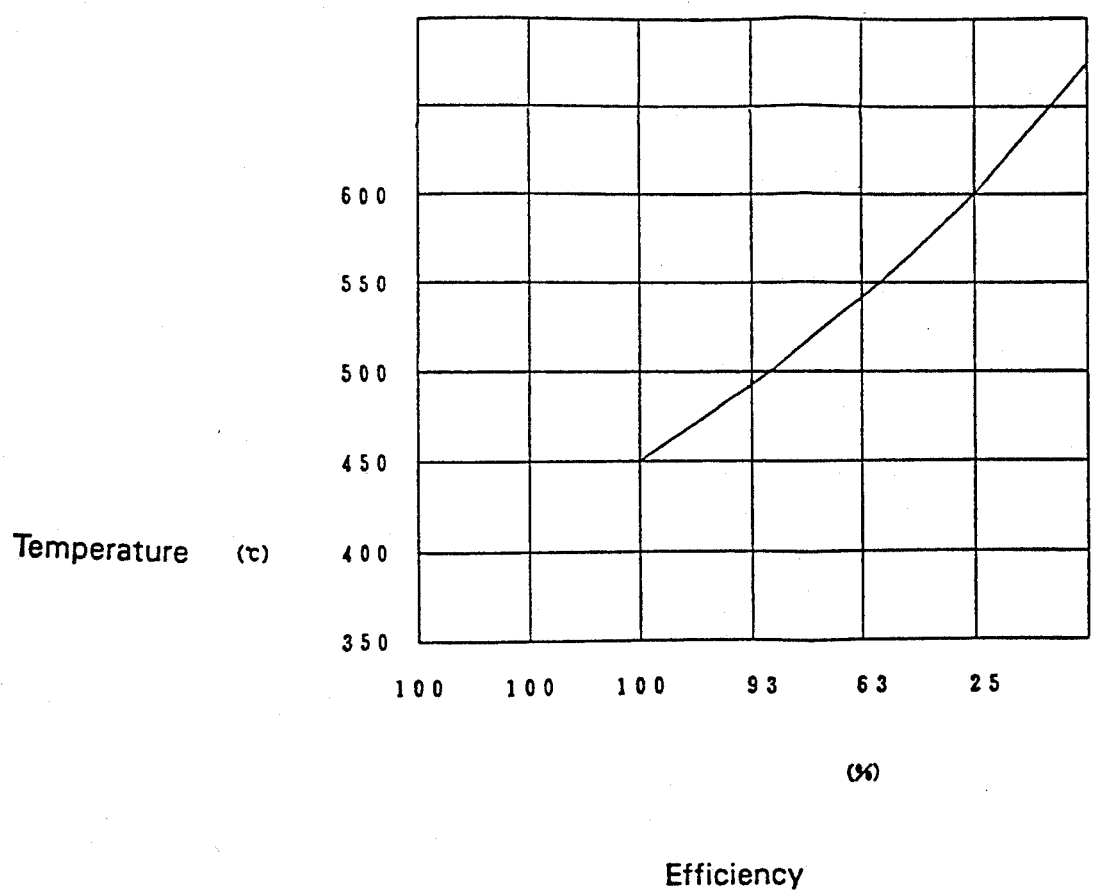
FIG. 5 is a graphic illustration depicting the relationship between exhaust gas temperature and treatment efficiency, empirically obtained during testing of the disclosed embodiment.

The variation between the exhaust gas temperature and the efficiency of the treatment was observed, and is graphically illustrated in FIG. 5. When the exhaust gas temperature was lowered by spraying $H_2O$ into the exhaust gas so that the temperature decreased to 450° C., the efficiency of reaction with the saturated aqueous vapor of $H_2O$ reached 100%. The concentration of waste liquid after neutralization exhibited a pH of 6–7.

EXAMPLE 2

Combustible material: B heavy oil; specific gravity 0.916; 2.29% sulfur
Calorific Value: 10,530 Kcal/kg
Burnt-up quantity: approx. 2 liters/hour
Exhaust gas temp. 450°–500° C. at entrance to reaction chamber
$H_2O$ temp. 15° C.
Quantity of $H_2O$ sprayed: 25 liters/minute continuous
Neutralizer: ammonium carbonate; 470 liters; concentration of 1 kg/100 liters.

| Desulfurization ratio: | Test #1 | Test #2 |
|---|---|---|
| Air Ratio | 1.24 | 1.23 |
| $SO_2$ concentration (at inlet) | 620 ppm | 895 ppm |
| $SO_2$ concentration (at outlet): | 0 ppm | 0 ppm |
| Desulferization ratio: | 100% | 100% |

In the foregoing example, the primary and secondary neutralization chambers were formed from columns of 0.75 m (dia.)×2 m (ht.) and a 0.5 m (dia.)×1.5 m (ht.), respectively. As indicated in the test data, a complete depollution of the exhaust gas was achieved.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

I claim:

1. A method for treating exhaust gases generated by incinerating industrial wastes in a combustion chamber leading to a reaction chamber, comprising the steps of:
   (a) introducing the exhaust gases from the combustion chamber to the reaction chamber while keeping a high temperature;
   (b) spraying the exhaust gases flowing through the reaction chamber with water to vaporize the water with the heat of the exhaust gases, reducing the temperature of the exhaust gases while forming a saturated aqueous vapor of microparticles in intimate contact with noxious materials of the exhaust gases, thereby permitting the vapor microparticles to absorb and collect the noxious materials of the exhaust gases to form an acidic, saturated aqueous vapor;
   (c) spraying the acidic, saturated aqueous vapor with a neutralizing agent in a primary neutralization chamber to at least substantially denature the acidic, saturated aqueous vapor to a neutralized waste liquid; and
   (d) collecting and evacuating the neutralized waste liquid.

2. The method of claim 1 including the step of separating the neutralized waste liquid evacuated from the primary neutralization chamber into sludge and liquid components so as to recycle the liquid component as spraying water to the reaction chamber.

3. The method of claim 2 wherein the neutralized waste liquid evacuated from the primary neutralization chamber is monitored in acidity by pH sensors so as to control the neutralizing agent in accordance with the acidity of the neutralized waste liquid.

4. The method of claim 1 including the steps of:
   (e) introducing remaining acidic, saturated aqueous vapor passing through the primary neutralization chamber to at least one secondary neutralization chamber,
   (f) spraying the acidic, saturated aqueous vapor in the secondary neutralization chamber with a neutralizing agent to at least substantially denature the acidic, saturated aqueous vapor to a neutralized waste liquid; and
   (g) collecting and evacuating the neutralized waste liquid.

5. The method of claim 4 wherein neutralized waste liquids evacuated from the primary and secondary neutralization chambers are monitored in acidity by pH sensors so as to control the neutralizing agent in accordance with the acidity of the neutralized waste liquids.

6. The method of claim 4 including the step of separating the neutralized waste liquids evacuated out of the primary and secondary neutralization chambers into sludge and liquid components so as to recycle the liquid component as spraying water to the reaction chamber.

7. The method of claim 4 wherein the neutralized waste liquid evacuated out of the primary neutralization chamber is monitored for acidity by a pH sensors so as to control the neutralizing agent in accordance with to the acidity of the neutralized waste liquid.

* * * * *